United States Patent
Eilam et al.

(10) Patent No.: US 9,411,702 B2
(45) Date of Patent: Aug. 9, 2016

(54) FLEXIBLE AND MODULAR LOAD TESTING AND MONITORING OF WORKLOADS

(71) Applicant: GlobalFoundries Inc., Grand Cayman (KY)

(72) Inventors: Tamar Eilam, New York, NY (US); Thomas Gschwind, Zurich (CH); Florian Rosenberg, New York, NY (US); Andreas Schade, Langnau am Albis (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 265 days.

(21) Appl. No.: 14/014,573

(22) Filed: Aug. 30, 2013

(65) Prior Publication Data

US 2015/0067404 A1    Mar. 5, 2015

(51) Int. Cl.
*G06F 11/30*    (2006.01)
*G06F 11/34*    (2006.01)

(52) U.S. Cl.
CPC ........ *G06F 11/3006* (2013.01); *G06F 11/3093* (2013.01); *G06F 11/3433* (2013.01); *G06F 11/3495* (2013.01); *G06F 2201/865* (2013.01)

(58) Field of Classification Search
USPC .......................................................... 714/33
See application file for complete search history.

(56) References Cited

U.S. PATENT DOCUMENTS

| | | | |
|---|---|---|---|
| 6,578,066 B1 * | 6/2003 | Logan et al. | 718/105 |
| 7,090,749 B2 | 8/2006 | Flores et al. | |
| 7,493,418 B2 | 2/2009 | Burton et al. | |
| 8,001,240 B2 | 8/2011 | Burton et al. | |
| 8,336,052 B2 | 12/2012 | Sharoff et al. | |
| 2003/0036897 A1 * | 2/2003 | Flores et al. | 703/22 |
| 2004/0249937 A1 * | 12/2004 | Tachihara et al. | 709/224 |
| 2006/0036878 A1 | 2/2006 | Rothman et al. | |
| 2008/0120406 A1 * | 5/2008 | Ahmed et al. | 709/224 |
| 2011/0041126 A1 | 2/2011 | Levy et al. | |
| 2011/0209196 A1 * | 8/2011 | Kennedy | G06F 21/55 726/1 |
| 2012/0102542 A1 * | 4/2012 | Kobayashi et al. | 726/1 |
| 2012/0137281 A1 * | 5/2012 | Kleiner | G06F 8/61 717/174 |
| 2013/0198755 A1 * | 8/2013 | Kim et al. | 718/104 |

* cited by examiner

*Primary Examiner* — Kamini Patel
(74) *Attorney, Agent, or Firm* — Michael J. LeStrange, Esq.

(57) ABSTRACT

Various embodiments monitor a distributed software system. In one embodiment, at least one monitoring policy associated with a distributed software system is selected. A policy type associated with the monitoring policy is identified. An installer is selected based on the policy type associated with the monitoring policy. Monitoring software is installed in a computing environment utilizing the installer. The monitoring software is configured to monitor the distributed software system based on the monitoring policy.

17 Claims, 10 Drawing Sheets

420

```
itm_policy(:policy_1) {
  description 'Policy checking if CPU load is above 30%'
  agent 'LZ'
  condition '*IF *VALUE KLZ_CPU.User_CPU *GT 30.00 *AND
             *VALUE KLZ_CPU.CPU_ID *EQ Aggregate'
  sampling_rate '000030'
}
```

```
component(:app_server) {
  load_driver(:load_driver1) {
    description 'SLAs on Synthetic Load Verification'
    assert "avg response time less than 3 seconds" do |data|
      data.response_time_avg < 3000
    end
    assert "maximum 50% server request errors" do |data|
      data.error_rate < 0.5
    end
    driver_hostname "load-driver-host.my-domain.com"
    driver_command 'my-ld'
    remote_data_dir "myscript-results"
  }
}
```

FIG. 3

FLEXIBLE AND MODULAR LOAD TESTING AND MONITORING OF WORKLOADS

BACKGROUND

The present invention generally relates to distributed software systems, and more particularly relates to load testing and monitoring distributed software systems.

DevOps is a set of methods, practices, and tools to streamline the collaboration between development and operations groups for developing and running complex distributed software system ("workloads"). One fundamental principle of DevOps is a continuous delivery process. This entails the automation of the entire software development and delivery pipeline in a well-defined and repeatable fashion. This includes building the software artifacts to pushing them through different stages into production.

BRIEF SUMMARY

In one embodiment, a method for monitoring a distributed software system is disclosed. The method comprises selecting at least one monitoring policy associated with a distributed software system. A policy type associated with the monitoring policy is identified. An installer is selected based on the policy type associated with the monitoring policy. Monitoring software is installed in a computing environment utilizing the installer. The monitoring software is configured to monitor the distributed software system based on the monitoring policy.

In another embodiment, an information processing system for monitoring a distributed software system is disclosed. The information processing system comprises a memory and a processor communicatively coupled to the memory. A workload processor is communicatively coupled to the memory and the processor. The workload processor is configured to perform a method. The method comprises selecting at least one monitoring policy associated with a distributed software system. A policy type associated with the monitoring policy is identified. An installer is selected based on the policy type associated with the monitoring policy. Monitoring software is installed in a computing environment utilizing the installer. The monitoring software is configured to monitor the distributed software system based on the monitoring policy.

In yet another embodiment, a computer program product for monitoring a distributed software system is disclosed. The computer program product comprises a storage medium readable by a processing circuit and storing instructions for execution by the processing circuit for performing a method. The method comprises selecting at least one monitoring policy associated with a distributed software system. A policy type associated with the monitoring policy is identified. An installer is selected based on the policy type associated with the monitoring policy. Monitoring software is installed in a computing environment utilizing the installer. The monitoring software is configured to monitor the distributed software system based on the monitoring policy.

In a further embodiment, a method for monitoring a distributed software system is disclosed. The method comprises selecting at least one load driver specification associated with a distributed software system. The load driver is configured to generate a synthetic load. At least one computing environment to host the load driver is identified from the load driver specification. Installing a load driver in the computing environment based on the load driver specification. Executing the load driver in the computing environment. The executing generating the synthetic load on one or more components of the distributed software system.

In another embodiment, an information processing system for monitoring a distributed software system is disclosed. The information processing system comprises a memory and a processor communicatively coupled to the memory. A workload processor is communicatively coupled to the memory and the processor. The workload processor is configured to perform a method. The method comprises selecting at least one load driver specification associated with a distributed software system. The load driver is configured to generate a synthetic load. At least one computing environment to host the load driver is identified from the load driver specification. Installing a load driver in the computing environment based on the load driver specification. Executing the load driver in the computing environment. The executing generating the synthetic load on one or more components of the distributed software system.

In yet another embodiment, a computer program product for monitoring a distributed software system is disclosed. The computer program product comprises a storage medium readable by a processing circuit and storing instructions for execution by the processing circuit for performing a method. The method comprises selecting at least one load driver specification associated with a distributed software system. The load driver is configured to generate a synthetic load. At least one computing environment to host the load driver is identified from the load driver specification. Installing a load driver in the computing environment based on the load driver specification. Executing the load driver in the computing environment. The executing generating the synthetic load on one or more components of the distributed software system.

In a further embodiment, a method for monitoring a distributed software system is disclosed. The method comprises executing at least one workload topology definition for a distributed software system. The workload topology definition defines a topology for the distributed software system. Execution of the workload topology definition deploys the distributed software system in a computing environment. The workload topology definition comprises at least one monitoring policy and at least one load driver specification. In response to the executing, a set of monitoring software is installed in a computing environment based on the monitoring policy. The monitoring software is configured to monitor the distributed software system based on one or more parameters defined by the monitoring policy. In response to the executing, a load driver is installed in at least one computing environment based on the at least one load driver specification. The load driver is configured to generate a synthetic load on one or more components of the distributed software system.

In another embodiment, an information processing system for monitoring a distributed software system is disclosed. The information processing system comprises a memory and a processor communicatively coupled to the memory. A workload processor is communicatively coupled to the memory and the processor. The workload processor is configured to perform a method. The method comprises executing at least one workload topology definition for a distributed software system. The workload topology definition defines a topology for the distributed software system. Execution of the workload topology definition deploys the distributed software system in a computing environment. The workload topology definition comprises at least one monitoring policy and at least one load driver specification. In response to the executing, a set of monitoring software is installed in a computing environment based on the monitoring policy. The monitoring software is configured to monitor the distributed software system based on one or more parameters defined by the monitoring policy. In response to the executing, a load driver is installed in at least one computing environment based on the at least one load driver specification. The load driver is configured to generate a synthetic load on one or more components of the distributed software system.

In yet another embodiment, a computer program product for monitoring a distributed software system is disclosed. The computer program product comprises a storage medium readable by a processing circuit and storing instructions for execution by the processing circuit for performing a method. The method comprises executing at least one workload topology definition for a distributed software system. The workload topology definition defines a topology for the distributed software system. Execution of the workload topology definition deploys the distributed software system in a computing environment. The workload topology definition comprises at least one monitoring policy and at least one load driver specification. In response to the executing, a set of monitoring software is installed in a computing environment based on the monitoring policy. The monitoring software is configured to monitor the distributed software system based on one or more parameters defined by the monitoring policy. In response to the executing, a load driver is installed in at least one computing environment based on the at least one load driver specification. The load driver is configured to generate a synthetic load on one or more components of the distributed software system.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 illustrates one example of a load driver specification according to one embodiment of the present invention;

FIG. 4 illustrates one example of monitoring policy definition according to one embodiment of the present invention;

DETAILED DESCRIPTION

Workloads (complex distributed software systems) comprise multiple components distributed across an arbitrary number of host machines, which collaborate together in order to achieve a common application purpose. A workload may include multiple components such as middleware, applications, configuration files, operating systems, virtual machines, etc. Due to the complexity of such workloads, a reliable and replicable deployment is not a simple task. This type of deployment requires specific support for both specifying the topology of the workload (workload topology definition) and the automated validation and execution of that definition. An executable workload topology definition can specify the application components, the hosts on which these components run, and the logical connections between application components. For executable workload topology definitions there is a workload topology processor (WTP) that validates and executes them.

The more complex workloads become, the more important is the aspect of monitoring the deployed system. Monitoring serves several purposes such as detecting anomalies potential shortages of resources or performance bottlenecks; guaranteeing Service Level Agreements (SLAs) regarding the performance or availability of the system; simulating the behavior and generating synthetic load; and continuously observing or tuning the running system by drilling down into its components.

Therefore, one or more embodiments provide various mechanisms for the specification, automated installation, activation, and deactivation of monitoring software and load drivers for workloads. The monitoring software observes the behavior of complex workloads. The load drivers generate synthetic load for complex workloads. As will be discussed in greater detail below, one or more embodiments comprise load driver processors (LDP) and monitoring policy processors (MPP) that provide automated installation, activation, and deactivation operations based on executing the load driver and monitoring policy specifications, respectively. These mechanisms can be implemented independently from an executable workload topology definition and the corresponding WTP. Alternatively, load drivers and monitoring policy specifications can be logically linked with the workload topology definition. In this embodiment, the LDP and MPP are integrated with the WTP.

Operating Environment

Figure 1:
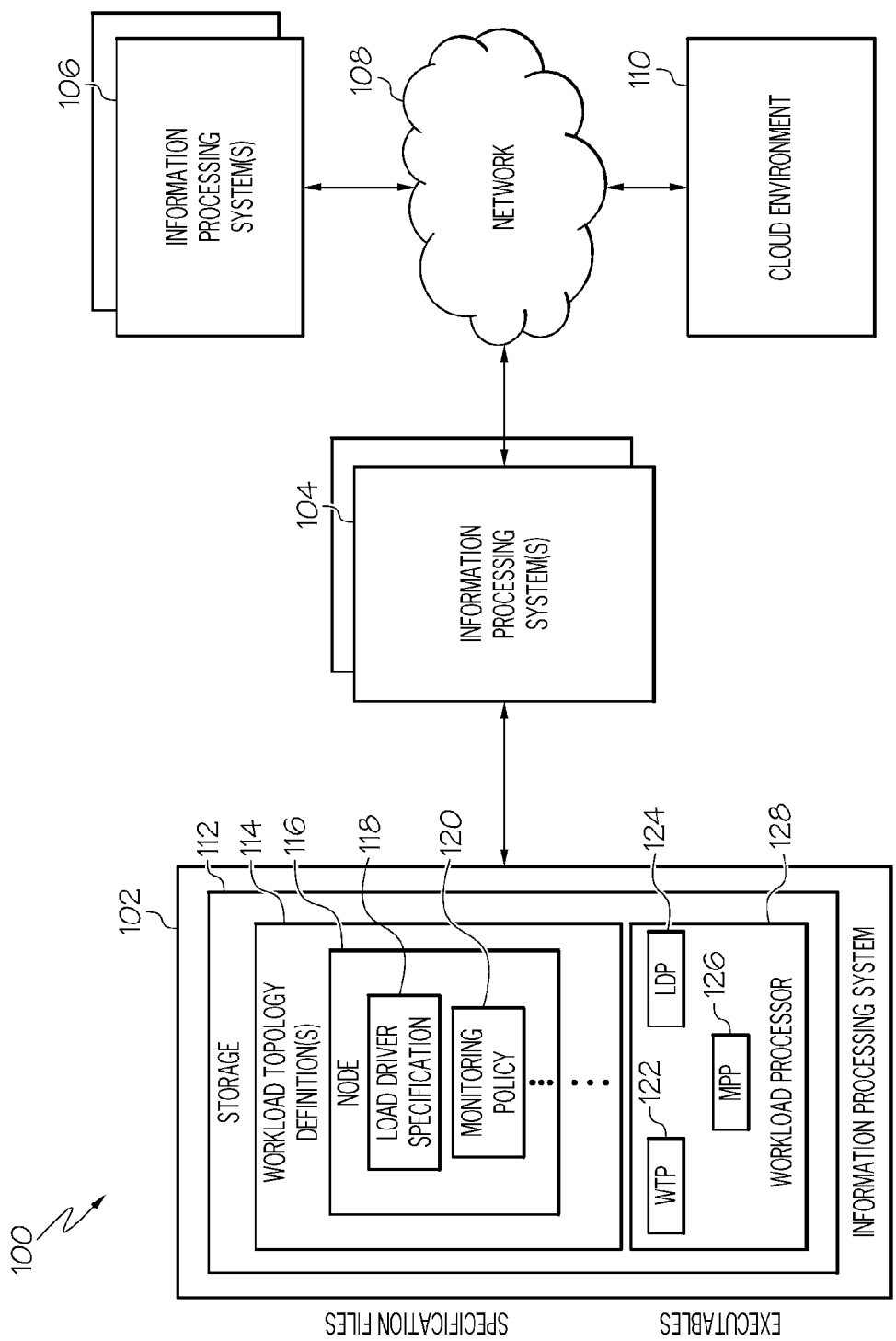
FIG. 1 is a block diagram illustrating one example of an operating environment according to one embodiment of the present invention.

FIG. 1 shows one example of an operating environment 100 for providing flexible and modular load testing and monitoring of workloads according to one embodiment of the present invention. The operating environment 100 comprises a plurality of information processing systems 102, 104, 106 that are communicatively coupled to a network 108. In this embodiment, a cloud computing environment 110 is also coupled to the network 108. However, it should be noted that embodiments of the present invention are not limited to a cloud environment and any computing environment is applicable as well.

At least one information processing system 102 comprises storage 112 for storing one or more workload topology definitions 114. In one embodiment, a workload topology definition 114 specifies the topology of a workload to be deployed. For example, the workload topology definition 114 specifies the application components of a workload, the hosts on which these components run, and the logical connections between application components. Workloads comprise multiple components distributed across an arbitrary number of host machines that collaborate together to achieve a common application purpose. A workload can include multiple components such as middleware, applications, configuration files, operating systems, virtual machines, etc.

In the example shown in FIG. 1, a workload topology definition 114 comprises one or more nodes 116 that represent individual virtual machines and provide a particular operating system. A node 116 can host one or many components that are to be installed on the platform provided by the node. The logical connection between the application components can be configured as well. Each node 116 comprises at least one or more load driver specifications 118 and one or more monitoring policies 120. The load driver specifications 118 and monitoring policies 120 can be standalone components or defined as part of the description of a workload topology definition 114 for providing monitoring functionality for particular application components. The load driver specifications 118 and monitoring policies 120 are discussed in greater detail below.

Figure 2:
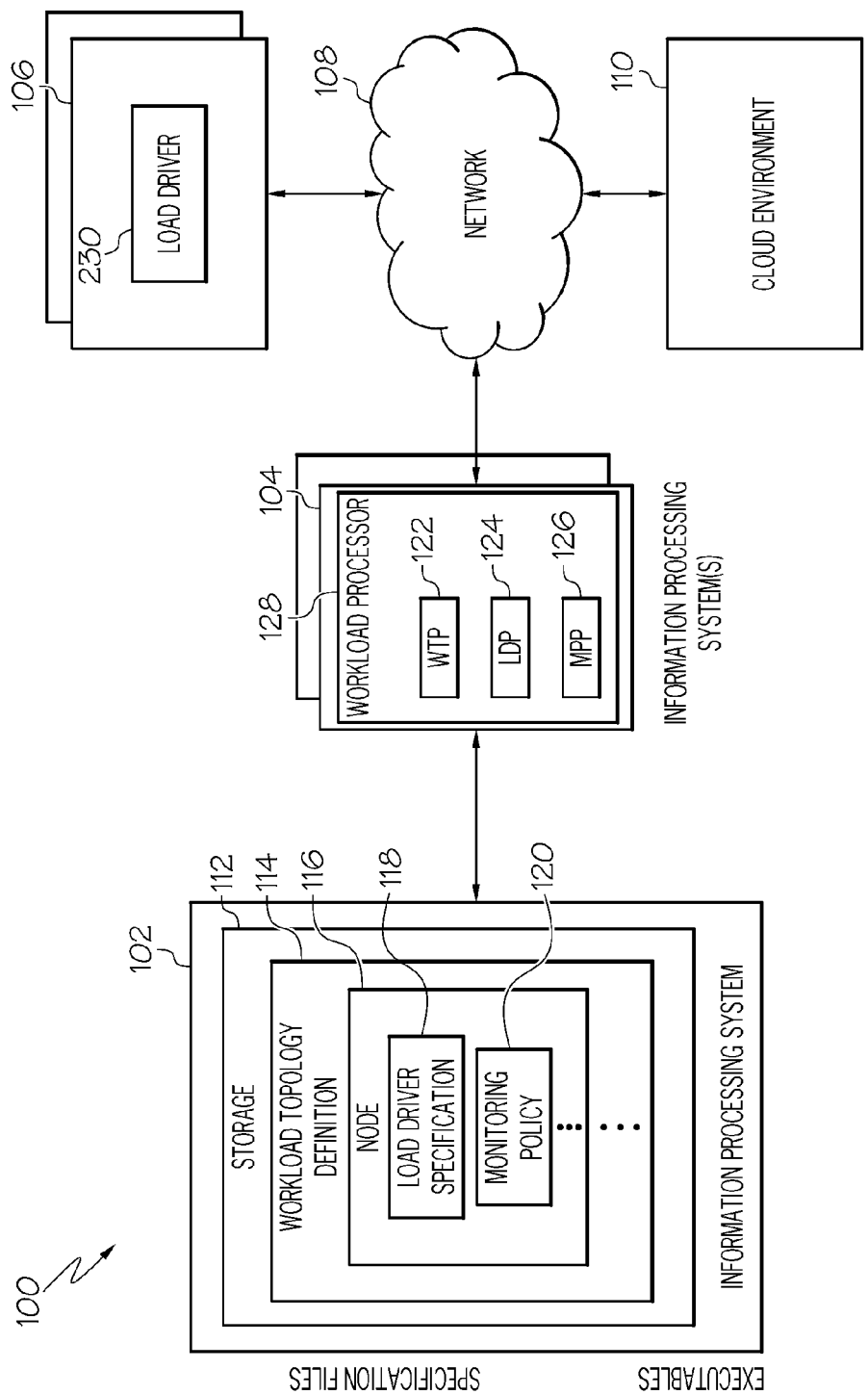
FIG. 2 illustrates the operating environment of FIG. 1 after various processing modules have been installed in a computing environment according to one embodiment of the present invention.

The storage 112, in one embodiment, also comprises one or more workload topology processors (WTPs) 122, load driver processors (LDPs) 124, and monitoring policy processors (MPPs) 126. The WTP 122 validates and executes the workload topology definitions 114. The LDP 124 provides automated installation, activation, and deactivation of one or more synthetic loads by executing the load driver specification(s) 118, which instantiates a load driver program 230 (FIG. 2). When the load driver 230 terminates the LDP 124 fetches the load driver results from the specified location on the load driver host 106 and evaluates the defined SLA assertions against this set of data. If the WTP 122 invokes the LDP 124, the load drivers 118 are activated during the WTP's performance-testing phase and terminates when done.

The MPP 126 provides automated installation, activation, and deactivation of one or more monitoring operations by executing the monitoring policy(s) 120. The LDP 124 and MPP 126 can be implemented independently from the executable workload topology definition 114 and corresponding WTP 122. However, in an embodiment where load drivers 118 and monitoring policies 120 are logically linked with the workload topology definition 114 the LDP 124 and MPP 126 are integrated with the WTP 122.

The WTP 122, the LDP 124, and MPP 126, in one embodiment, are installed and executed on the same system 102 that comprises the workload topology definitions 114, the load driver specifications 118, and/or the monitoring policies 120, as shown in FIG. 1. However, in other embodiments, one or more of the WTP 122, the LDP 124, and MPP 126 can be installed and executed on one or more different systems 104, as shown in FIG. 2. In one embodiment, the WTP 122, the LDP 124, and MPP 126 are collectively referred to as the "workload processor 228".

Load Drivers and Monitoring Policies

The following is a more detailed discussion on load driver specifications 118, load driver programs 230 (also referred to herein as "load driver programs 230"), and monitoring policies 120. A load driver specification 118 specifies the properties of a load driver program 230. In one embodiment, a load driver specification 118 is processed by a LDP 124. The result of this processing is the instantiation of a load driver program 230. A load driver program 230 runs on one or more dedicated load driver hosts 106. The load driver host 106 may be either a separate machine or it can be part of the deployed system/workload. The load driver host 106 may also be the host 104 that the WTP 122 itself runs on.

In one embodiment, the load driver program 230 generates synthetic test data and test messages ("load") and sends them to a recipient to be tested. For example, the load driver program 230 generates synthetic load for the workload corresponding to the workload topology definition 114. In one embodiment, the load driver program 230 is a generic extension for generating load on parts of a deployed system/workload. Non-limiting examples of important properties of the generated load are its size and the speed in which it is sent. In addition to generating synthetic load the load driver program 230 collects data, which allows the measurement of SLAs and their verification with respect to the synthetic load from a client perspective. In one embodiment, there is a general-purpose service for load driver programs 230 that provides an execute operation and a download operation. The execute operation is for remotely executing a load driver program 230 with arbitrary parameters as specified in the load driver specification 118. The download operation is for downloading any data collected by the load driver program 230.

In one embodiment, a load driver specification 118 generally comprises the name of the load driver; a human-readable description (optional); one more load driver hosts; per load driver host the name of an executable load driver program; a condition representing an assertion of an SLA (optional); information on where and how to fetch the collected load driver data (optional); and the load generation target (if not embedded into a workload topology definition 114). If the load driver specification 118 is embedded into the workload topology 114 it can be defined for a particular component (e.g., an application or a service running on a particular host) and generate a synthetic load directed to this component. In this embodiment, the information about the load generation target and how to connect to it is derived from the relative position of the load driver specification 118 within the workload topology 114. The relative position, in one embodiment, is given by the containing specification element in the workload topology 114. If, for example, the load driver specification 118 is included in a node specification 116 then the virtual machine represented by node 116 is the load target. Otherwise, this information can be provided by the load driver definition 118. One example of a load driver 318 is illustrated in FIG. 3. In this example, the load driver 318 is embedded into a workload topology 114. When executed the code shown in FIG. 3 triggers the execution of the load driver "my-ld" on the target "load-driver-host.my-domain.com" via the load driver remote execution service discussed above.

A monitoring policy 120 specifies how the behavior of the deployed workload is to be observed/monitored. Monitoring policy definitions 120 add monitoring to selected nodes or components (such as an application server) within a workload. In addition to validation, monitoring is an important aspect for deploying and operating complex workloads because it allows the observation of the behavior of deployed system components and the detection of potential resource shortages or degrading performance. A given monitoring policy 120 defines a monitoring feature and assigns a policy name. The feature is represented by a condition expression and a set of additional parameters, which are sent to the underlying monitoring software. This software evaluates the condition and generates alerts that cause messages to be sent or visualized in some form of user interface. Monitoring policies 120 also provide a mechanism to switch the corresponding monitoring feature on and off.

Different monitoring policies 120 can be associated with different monitoring software with different capabilities, parameters, and configuration options. For each kind of supported monitoring software there is a corresponding monitoring policy type. All types of monitoring policy specifications provide at least the following information: the name of the monitoring policy: a human-readable description (optional); a condition indicating in what situations an action should be triggered; the action to be executed when the condition is fulfilled (optional if the monitoring software provides a default action such as "display an alert"); and the scope that applies to this monitoring policy (if not embedded into a workload topology definition).

The scope of a monitoring policy 120 can be a host, a particular component (such as an application or a service), or a load driver specification 118. If embedded into a workload topology definition 114, the scope of a monitoring policy definition 120 is derived from its relative position within the workload topology definition 114. Otherwise, the scope is provided by the monitoring policy 120. If the scope of the monitoring policy 120 is a load driver specification 118, the monitoring policy 120 is activated when the load driver program 230 corresponding to the load driver specification 118 starts and is deactivated when this load driver program 230 terminates. In any other case the monitoring policy 120 remains active.

One example of a monitoring policy type is the type "itm_policy" that is used to define monitoring based on rules observed by the IBM Tivoli Monitoring (ITM) product. This monitoring policy type allows the definition of monitoring options specific to ITM. One example of a monitoring policy definition 420 is illustrated in FIG. 4, which shows a monitoring policy "policy_1" of the type "itm_policy".

Based on the monitoring policy type the MPP 126 derives which monitoring software is to be installed and what application component is to be instrumented with monitoring code. If, for example, the MPP 126 detects an itm_policy, the MPP 126 installs the correct ITM agent on the host that is associated with the monitoring policy. For this purpose each monitoring policy type is associated with a dedicated installer (e.g. a chef script) that installs the corresponding monitoring software when invoked by the MPP 126.

When the MPP 126 processes a monitoring policy 120, the MPP 126 also generates code for activating and deactivating the monitoring policy. The MPP 126 creates a policy service for each monitoring policy 120. This service provides two methods: a start method and a stop method. The start method is for remotely starting a particular monitoring policy 120 on the policy host. The stop method is for remotely stopping a particular policy 120 on the policy host. Starting a policy 120 means activating the monitoring feature, whereas stopping the policy 120 deactivates the monitoring feature. Policy activation and deactivation can be implemented as a remote method invocation over any suitable transport protocol.

Workload Deployment and the Processing of Load Drivers and Monitoring Policies

Figure 5:
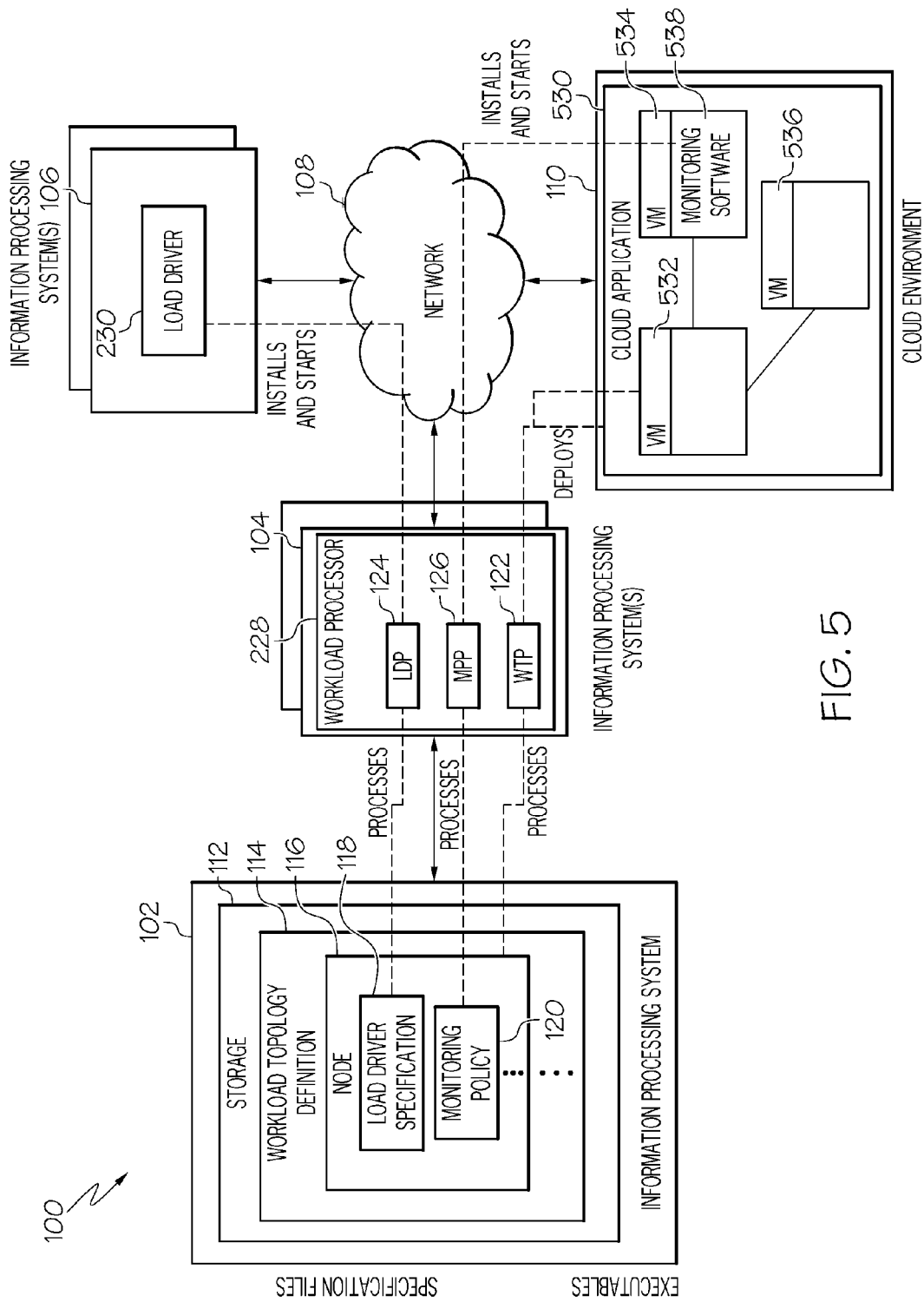
FIG. 5 illustrates the operating environment of FIG. 1 after a workload has been deployed and various monitoring/testing components have been installed according to one embodiment of the present invention.

As discussed above, the WTP 122 executes a workload topology definition 114 for deploying a workload. In one embodiment, the workload is deployed as an application(s) 530 (e.g., a virtual application) on one or more virtual machines 532, 534, 536 hosted in the cloud computing environment 110, as shown in FIG. 5. In this embodiment, workload topology definitions 114 are written in a specification language that supports programmable definitions of workload topologies for virtual environments. When the WTP 122 executes a workload topology definition 114 the execution results in an instance of the virtual application (workload) 530 being installed and executed on the cloud environment 110 as defined by the workload topology definition 114. One example of an overall sequence of building, publishing, deploying and running a workload on the cloud environment 110 by the WTP 122 is as follows:

1.) Build, package, and publish the application;
2.) Package and publish the infrastructure code;
3.) Pre-deployment validation;
4.) Deploy the application;
5.) Post-deployment validation;
6.) Performance testing; and
7.) Operations phase.

In first stage, the application code of the workload is compiled, packaged, and published to a definitive software library that comprises each build of the application with a specific version and a state (e.g., unverified, verified, release candidate, etc.). In the second stage, the deployment automation code of the workload is packaged and published to the definitive software library and linked to the particular version of the application code that it is compatible and tested with. The third, fourth, and fifth stages describe the deployment of the virtual application 530 (workload) that is driven from the workload topology definition 114. Before deployment of the virtual application 530, dedicated validation is executed to ensure that the workload topology definition 114 is valid (e.g., all properties are set, values are correct, etc.). After the deployment of the virtual application 530, specific post-deployment validation rules are checked to ensure the individual components of the application 530 were correctly installed and configured and that the deployed application 530 is ready to serve requests. In the sixth stage, performance testing is performed based on the load driver specifications 118 and the monitoring policies 120 that are specified in the workload topology definition 114. This ensures that a new build of the application 530 satisfies a given set of SLAs. After the performance testing the system switches to the "operations phase". In this stage all load driver programs 230 driven by load driver specifications 118 and monitoring policies 120 that are not relevant for the operation of the virtual application 530 (i.e., they were only relevant for the performance testing) are deactivated.

If load driver specifications 118 and monitoring policies 120 are linked with the workload topology definitions 114, they are relevant in both the performance testing stage and the operations phase of the WTP 122. The operations phase starts when the application 530 runs in production mode under realistic usage conditions. After deployment of the application 530, but prior to its actual use in production, there is an optional performance-testing phase in which the application 530 can be tested in order to identify potential resource consumption problems or performance bottlenecks that may negatively affect the application 530 during operation.

The execution of load driver programs 230 by an LDP 124 and MPP 126 is based on, in one embodiment, load driver specifications 118 or monitoring policies 120, respectively. This execution automatically installs, configures, and runs load driver programs for generating synthetic load and different types of monitoring software for monitoring application components. If embedded into the workload topology definition, the WTP 122 can trigger these processes and the execution of the workload topology definition 114 also deploys load drivers and monitoring software.

As discussed above, the MPP 126 executes monitoring policies 120. When a given policy 120 of a particular type is processed, the MPP 126 looks up the corresponding installer for these policies 120. The MPP 126 then runs the installer on the policy host, which in this example is one or more of the virtual machines 532, 534, 536 of the application 530. The installer then installs monitoring software 538 on the host, as shown in FIG. 5. In stand-alone monitoring policies 120 that are not embedded in a workload topology definition, the policy host can be specified as part of the policy explicitly. Next, the MPP 126 generates the policy service for the particular policy in process and also installs it on the policy host. In one embodiment, the start method of the policy service sends the policy condition and the accompanying action to the monitoring software 538 and activates the condition such that the monitoring software 538 executes the action when the condition becomes true.

With respect to load driver specification 118, the LDP 124 executes and runs load driver programs 230 on one or more host systems 106, as shown in FIG. 5. When a given load driver specification 118 is processed, the LDP 124 looks up all monitoring policies 120 embedded in load driver specifications 118 and calls the MPP 126 that executes these types of policies 120. The MPP 126 executes the monitoring policies 120, as discussed above. The LDP 124 then starts the load driver 230 by calling the execute method of the generic load driver service. In stand-alone load drivers the load driver target is specified as part of the load driver specification. The load driver target is passed to the load driver service as a parameter of the execute method. When the load driver 230 terminates and the load driver specification parameters indicate that the load driver collects performance test data, the LDP 124 calls the load method of the load driver service, downloads the performance test data, and evaluates the assertions defined as part of the load driver specification using the performance test data. Finally, the LDP 124 deactivates all monitoring policies it activated previously using the MPP 126, which calls the stop method of each corresponding policy service.

In one embodiment, load driver specifications 118 and monitoring policies 120 are embedded within one or more workload topology definitions 114. In this embodiment, embedded monitoring policies and load driver definitions are automatically processed as part of the execution of the containing workload topology definition 114. The processing differs from that in the stand-alone embodiment in the following ways. First, the subtasks for processing load driver specifications 118 and monitoring policies 120 discussed above are integrated with the deployment, performance-testing, and operations steps of the execution of the workload topology. Second, the targets for load driver definitions 118 and hosts for monitoring policies 120 can be derived from the relative positions of the respective load driver specifications 118 and monitoring policy specifications 120 in the workload topology definition 114.

For example, at deployment time all monitoring software required by the monitoring policies 120 specified in the workload topology definition document 114 is installed and configured. The following pseudocode shows one example of installing monitoring policies 120 embedded on the node level or the component level within a workload topology definition 114:

```
for each node <n> do
    ...
    for each monitoring policy <nmp> do
        Run <nmp>'s installer on <n>
    done
    ...
    for each component <c> in <n> do
        for each monitoring policy <cmp> do
            Run <cmp>'s installer on <n>
        done
        ...
    done
done
```

In the performance-testing phase all load driver definitions 118 are processed. Before a load driver program 230 driven by a load driver specification 118 is started all associated monitoring policies 120 are configured and activated. When the load driver program 230 terminates, all previously activated monitoring policies 120 are deactivated. The following pseudocode shows one example of starting/stopping a load driver program 230 associated with a load driver specification 118 embedded within a workload topology definition 114 and activating/deactivating a corresponding embedded monitoring policy 120:

```
for each node <n> do
    for each component <c> in <n> do
        for each load driver specification<ld> in <c> do
            for each monitoring policy <mp> in ld do
                policy service: start <mp>
            done
            load driver service: start <ld>
            if <ld> has collected data then
                download data from <ld.remote_dir>
                for each assertion <a> in <ld> do
                    if <a> is violated then
                        trigger alerts
                    end if
                done
            end if
            for each monitoring policy <mp> in <ld> do
                policy service: stop <mp>
            done
        done
    done
done
```

At the beginning of the operations phase all monitoring polices 120 are activated that were not specified as part of a load driver definition 118, as shown in the pseudocode below:

```
for each node <n> do
    for each monitoring policy <mp> in <n> do
        policy service: start <mp>
    done
    for each component <c> within <n> do
        for each monitoring policy <mp> in <c> do
            policy service: start <mp>
        done
    done
done
```

Similar to the stand alone case discussed above, once a load driver program 230 terminates and the load driver specification parameters indicates that the load driver program 230 collects performance test data, the LDP 124 calls the load method of the load driver service, downloads the performance test data, and evaluates the assertions defined as part of the load driver specification using the performance test data. The LDP 124 deactivates all monitoring policies 120 it activated previously using the MPP 126, which calls the stop method of each corresponding policy service.

As can be seen from the above discussions, various embodiments of the present invention reuse the same monitoring infrastructure for use during testing and for use during the production of a system. This effectively reduces the overhead of having to maintain two such infrastructures. Additionally, various embodiments support the transparent integration into a continuous delivery process in which all artifacts used for development and operation of the workload are unified in a single build process. This simplifies the interaction between the development and operations team. Another advantage is that the installation of monitoring software is performed automatically. The monitoring software that needs to be installed can be inferred depending on the monitoring policies referenced by the workload topology definition.

A further advantage of the various embodiments discussed above is that a unified approach for configuring, activating, and deactivating monitoring policies is used for both the performance-testing phase and the operations phase. The automatic generation of synthetic load for selected components of the workload topology definition and the evaluation of assertions representing SLAs pertaining to the performance of the tested workload monitoring policies can be easily reused for monitoring a particular application with or without synthetic load even if the application is part of different workload definitions.

Operational Flow Diagrams

Figure 6:
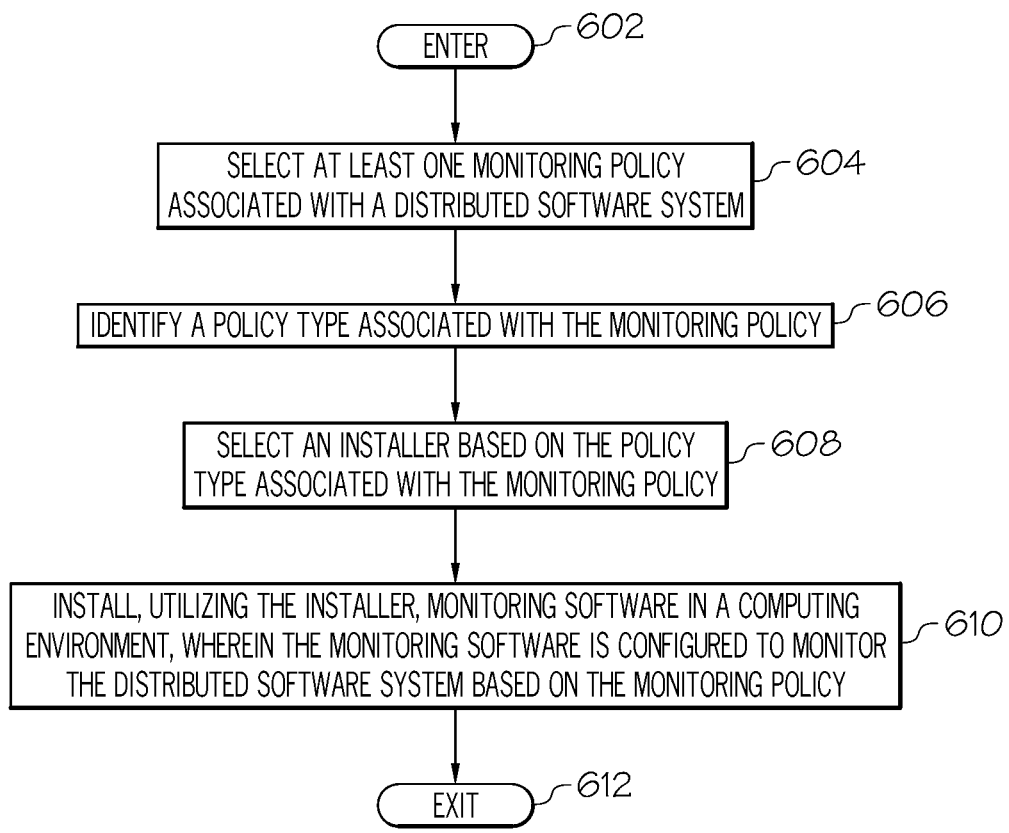
FIGS. 6-8 are operational flow diagrams illustrating examples of processes for monitoring a workload according to various embodiments of the present invention.

FIG. 6 is an operational flow diagram illustrating one example of a process for monitoring a workload (distributed software system). The operational flow begins at step 602 and flows directly to step 604. The workload processor 228, at step 604, selects at least one monitoring policy 120 associated with a workload. The workload processor 228, at step 606, identifies a policy type associated with the monitoring policy 120. The workload processor 228, at step 608, selects an installer based on the policy type associated with the monitoring policy 120. The workload processor 228, at step 610, installs, utilizing the installer, monitoring software 538 in a computing environment 534. The monitoring software 538 is configured to monitor the workload based on the monitoring policy 120. The control flow then exits at step 612.

Figure 7:
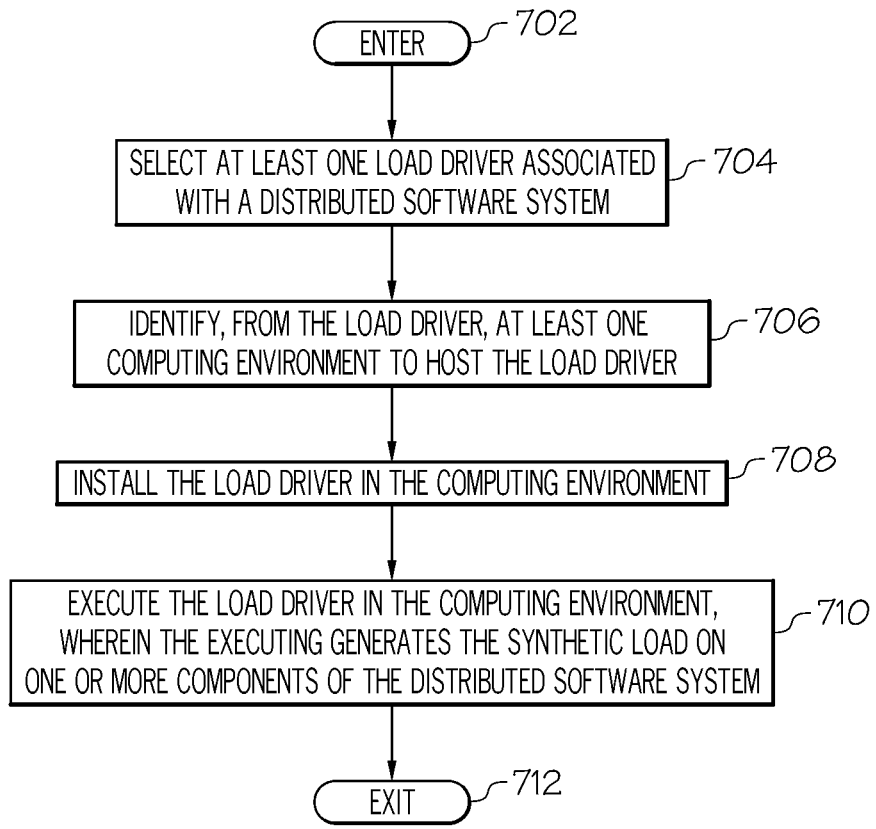

FIG. 7 is an operational flow diagram illustrating another example of a process for monitoring a workload (distributed software system). The operational flow begins at step 702 and flows directly to step 704. The workload processor 228, at step 704, selects at least one load driver specification 118 associated with a workload. The load driver specification 118 drives the generation of synthetic load for testing one or more components of the distributed software system 530. The workload processor 228, at step 706, identifies, from the load driver specification 118, at least one computing environment 106 to host the load driver program 230. The workload processor 228, at step 708, installs the load driver program 230 in the computing environment 106. The workload processor 228, at step 710, executes the load driver program 230 in the computing environment 106. The execution generates the synthetic load on one or more components of the distributed software system 530. The control flow exits at step 712.

Figure 8:
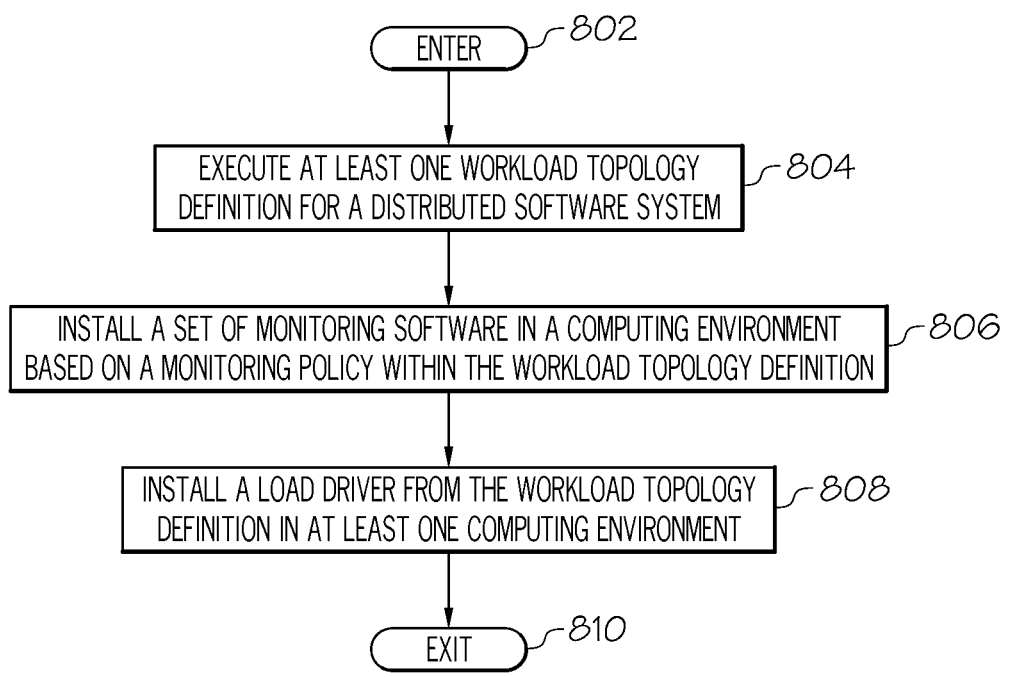

FIG. 8 is an operational flow diagram illustrating yet another example of a process for monitoring a workload (distributed software system). The operational flow begins at step 802 and flows directly to step 804. The workload processor 228, at step 804, executes at least one workload topology definition 114. The workload topology definition 114 defines a topology for the workload (distributed software system). The execution of the workload topology definition 114 deploys the workload in a cloud computing cloud environment 110. The workload topology definition 114 comprises at least one load driver specification 118 and at least one monitoring policy 120. The workload processor 228, at step 806, installs a set of monitoring software 538 in a computing environment 534 based on the monitoring policy 120. The monitoring software 538 is configured to monitor the workload based on one or more parameters defined by the monitoring policy 120. The workload processor 228, at step 808, installs the load driver 230 described by the load driver specification 118 in at least one computing environment 106. The load driver program 230 is configured to generate a synthetic load on one or more components of the workload. The control flow exits at step 810.

Example of an Information Processing System

Figure 9:
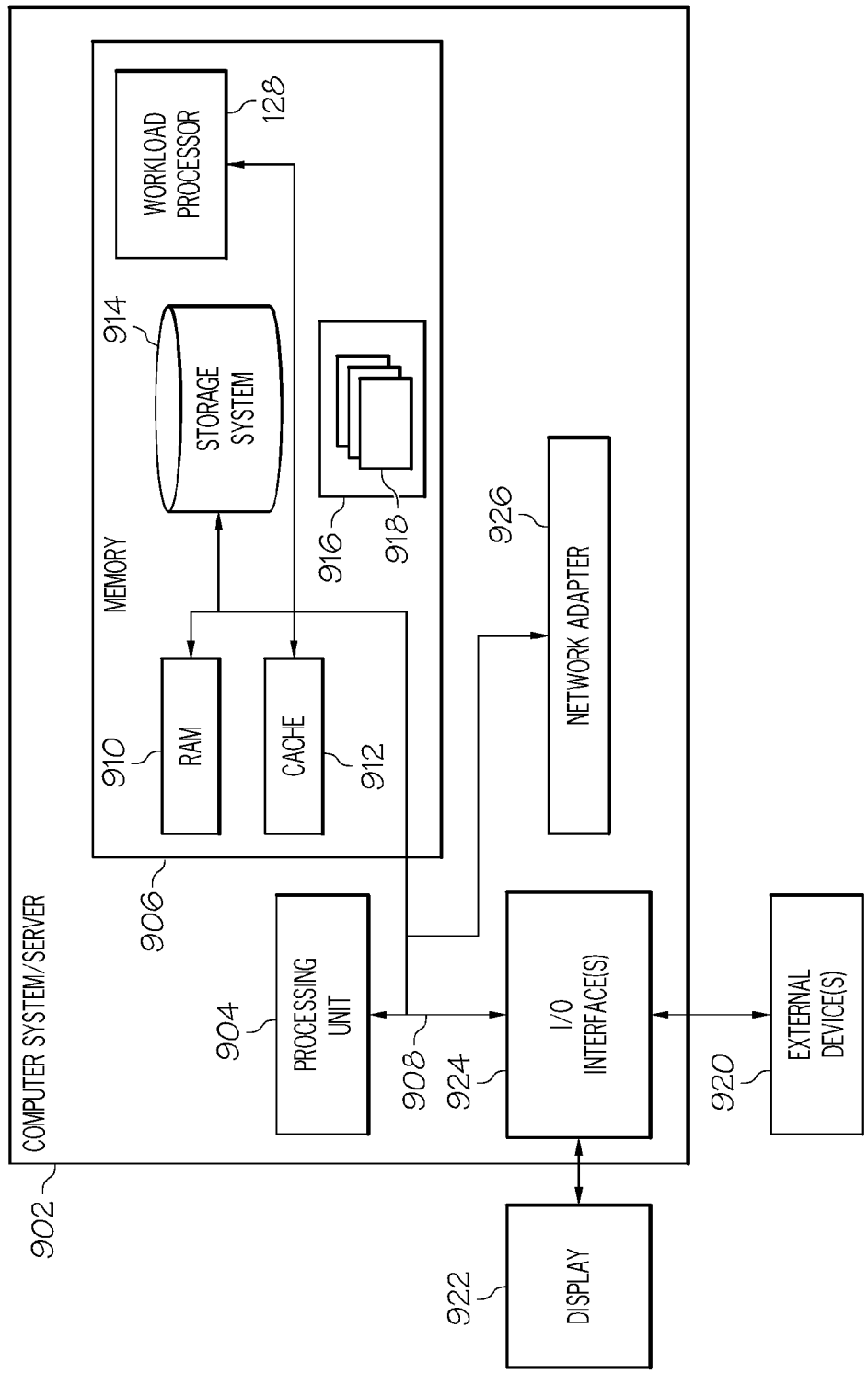
FIG. 9 is a block diagram illustrating a detailed view of an information processing system according to one embodiment of the present invention.

FIG. 9 illustrates one example of an information processing system 902 that can be utilized in various embodiments of the present invention. The information processing system 902 shown in FIG. 9 is only one example of a suitable system and is not intended to limit the scope of use or functionality of embodiments of the present invention described above. The information processing system 902 of FIG. 9 is capable of implementing and/or performing any of the functionality set forth above. Any suitably configured processing system can be used as the information processing system 902 in embodiments of the present invention.

The information processing system 902 is operational with numerous other general purpose or special purpose computing system environments or configurations. Examples of well-known computing systems, environments, and/or configurations that may be suitable for use with the information processing system 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The information processing system 902 may be described in the general context of computer system-executable instructions, such as program modules, being executed by a computer system. Generally, program modules may include routines, programs, objects, components, logic, data structures, and so on that perform particular tasks or implement particular abstract data types. The information processing system 902 may be practiced in various computing environments such as conventional and distributed cloud computing environments where tasks are performed by remote processing devices that are linked through a communications network. In a distributed cloud computing environment, program modules may be located in both local and remote computer system storage media including memory storage devices.

As illustrated in FIG. 9, the information processing system 902 is in the form of a general-purpose computing device. The components of the information processing system 902 can include, but are not limited to, one or more processors or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906, in one embodiment, comprises the workload processor 228 and its components discussed above. Even though FIG. 9 shows the workload processor 228 residing in the main memory, the workload processor 228 or at least one of its components can reside within the processor 904, be a separate hardware component, and/or be distributed across a plurality of information processing systems and/or processors.

The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present invention.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the present invention.

The information processing system 902 can also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication can occur via I/O interfaces 924. Still yet, the information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, but are not limited to: microcode, device drivers, redundant processing units, external disk drive arrays, RAID systems, tape drives, and data archival storage systems.

Cloud Environment

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or by a third party, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
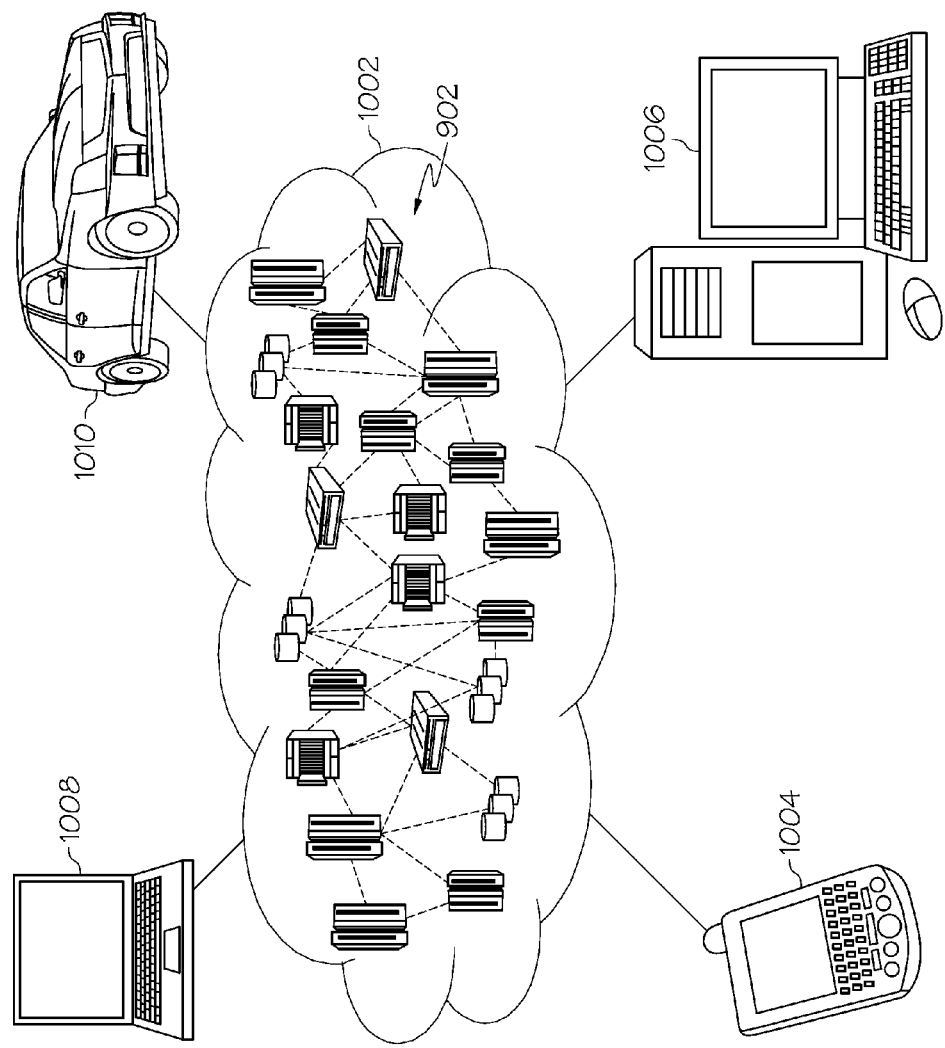
FIG. 10 illustrates one example of a cloud computing environment according to one example of the present invention.

Referring now to FIG. 10, illustrative cloud computing environment 1002 is depicted. As shown, cloud computing environment 1002 comprises one or more information processing systems 902 with which local computing devices used by cloud consumers, such as, for example, personal digital assistant (PDA) or cellular telephone 1004, desktop computer 1006, laptop computer 1008, and/or automobile computer system 1010 may communicate. Each node within the environment 1002 may communicate with one another. They may be grouped (not shown) physically or virtually, in one or more networks, such as Private, Community, Public, or Hybrid clouds as described hereinabove, or a combination thereof. This allows cloud computing environment 1002 to offer infrastructure, platforms and/or software as services for which a cloud consumer does not need to maintain resources on a local computing device. It is understood that the types of computing devices 1004, 1006, 1008, 1010 shown in FIG. 10 are intended to be illustrative only and that computing nodes 902 and cloud computing environment 1002 can communicate with any type of computerized device over any type of network and/or network addressable connection (e.g., using a web browser).

Figure 11:
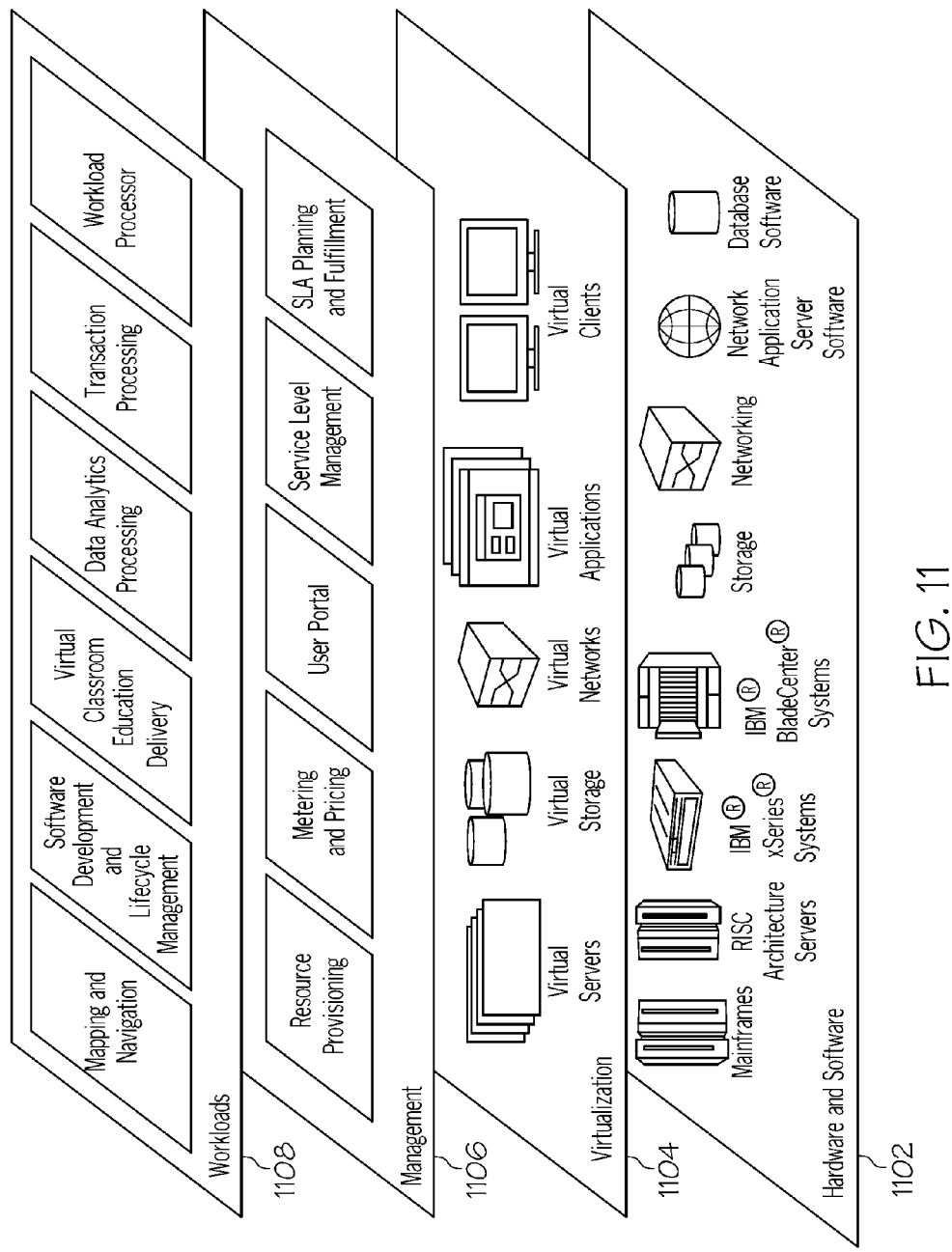
FIG. 11 illustrates abstraction model layers according to one example of the present invention.

Referring now to FIG. 11, a set of functional abstraction layers provided by cloud computing environment 1002 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload processing.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring a distributed software system, the method comprising:

selecting at least one monitoring policy associated with a distributed software system, wherein the monitoring policy defines a monitoring feature by specifying how a behavior of one or more components of the distributed software system is to be monitored, wherein the monitoring policy is included within a workload topology definition, wherein the workload topology definition defines a topology for the distributed software system, and wherein execution of the workload topology definition deploys the distributed software system in a computing environment;

identifying a policy type associated with the monitoring policy, wherein the policy type defines conditions for the one or more components of the distributed software system indicating situations in which an action should be triggered and the action to be executed for the conditions according to the monitoring policy and indicates monitoring software to be installed within a computing environment and what application component is to be instrumented based on the policy type;

selecting an installer based on the policy type associated with the monitoring policy; and installing, utilizing the installer, the monitoring software in the computing environment, wherein the monitoring software is configured to monitor the behavior of the distributed software system based on the monitoring policy.

2. The method of claim 1, further comprising:

installing, based on the policy type associated with the monitoring policy, a policy service in the computing environment, wherein the policy service configures the monitoring software to execute one or more actions based on at least one policy condition being satisfied.

3. The method of claim 1, wherein the monitoring policy comprises at least one of:
   a name of the monitoring policy;
   a human-readable description of the monitoring policy;
   one or more policy conditions indicating when a given action is to be performed by the monitoring software;
   one or more actions to be performed by the monitoring software when the one or more policy conditions have been satisfied; and
   a scope of the monitoring policy.

4. The method of claim 1, wherein the monitoring software is identified from the policy type and the monitoring policy.

5. The method of claim 1, wherein the monitoring policy is associated with at least one load driver definition, wherein the load driver definition triggers an execution of load driver software that generates a synthetic load on one or more components of the distributed software system.

6. The method of claim 5, wherein the monitoring policy is active during the execution of the load driver software and deactivated otherwise.

7. The method of claim 1, wherein the monitoring software is installed during deployment of the distributed software system in a computing environment based on the workload topology definition.

8. A method for monitoring a distributed software system, the method comprising:
   selecting at least one load driver specification associated with a distributed software system;
   identifying, from the load driver specification, at least one computing environment to host a load driver, wherein the load driver is configured to generate a synthetic load;
   installing the load driver in the computing environment based on the load driver specification;
   executing the load driver in the computing environment, wherein the executing generates the synthetic load on one or more components of the distributed software system;
   determining that the load driver specification comprises at least one monitoring policy wherein the monitoring policy specifies how a behavior of the one or more components of the distributed software system is to be monitored during the synthetic load, wherein the monitoring policy is included within a workload topology definition, wherein the workload topology definition defines a topology for the distributed software system, and wherein execution of the workload topology definition deploys the distributed software system in the at least one computing environment;
   identifying a policy type associated with the monitoring policy, wherein the policy type defines conditions for the one or more components of the distributed software system indicating situations in which an action should be triggered and the action to be executed for the conditions according to the monitoring policy and indicates monitoring software to be installed within the computing environment and what application component is to be instrumented based on the policy type;
   selecting an installer based on the policy type associated with the monitoring policy; and
   installing, utilizing the installer, the monitoring software in the computing environment, wherein the monitoring software is configured to monitor the behavior of the distributed software system based on the monitoring policy.

9. The method of claim 8, wherein the load driver specification comprises at least one of:
   a name of the load driver;
   a human-readable description of the load driver;
   an identification of one or more computing environments to host to the load driver;
   an identification of an executable program to run after the load driver has been started in a computing environment;
   one or more conditions representing an assertion of at least one Service Level Agreement;
   instructions on where and how to fetch collected load driver data; and
   an identification of a target for which to generate a synthetic load.

10. The method of claim 8, wherein the load driver is configured to collect data associated with one or more behaviors of the one or more components of the distributed software system with respect to the synthetic load.

11. The method of claim 8, wherein the monitoring software is active while the load driver is running, and deactivated otherwise.

12. A method for monitoring a distributed software system, the method comprising:
   executing at least one workload topology definition for a distributed software system, wherein the workload topology definition defines a topology for the distributed software system, and wherein execution of the workload topology definition deploys the distributed software system in a computing environment, wherein the workload topology definition comprises at least one monitoring policy and at least one load driver specification, the monitoring policy specifying how one or more components of the distributed software system is to be monitored;
   identifying a policy type associated with the monitoring policy, wherein the policy type defines conditions for the one or more components of the distributed software system indicating situations in which an action should be triggered and the action to be executed for the conditions according to the monitoring policy and indicates a set of monitoring software to be installed within the computing environment and what application component is to be instrumented based on the policy type;
   selecting an installer based on the policy type associated with the monitoring policy;
   installing, utilizing the installer, the set of monitoring software in the computing environment based on the monitoring policy, wherein the set of monitoring software is configured to monitor the behavior of the distributed software system based on one or more parameters defined by the monitoring policy; and
   installing, based on the executing, a load driver in at least one computing environment based on the at least one load driver specification, wherein the load driver is configured to generate a synthetic load on one or more components of the distributed software system, wherein the monitoring software is installed during deployment of the distributed software system in the computing environment based on the workload topology definition.

13. The method of claim 12, wherein the monitoring policy is included within the load driver specification and configures the set of monitoring software to monitor one or more performance characteristics of the distributed software system with respect to the synthetic load.

14. The method of claim 13, further comprising:
   activating the at least one monitoring policy prior to starting the load driver.

15. The method of claim 14, wherein the at least one monitoring policy is deactivated when the load driver terminates.

16. The method of claim 12, wherein the at least one monitoring policy is independent of the load driver specification.

17. The method of claim 16, further comprising:
activating the at least one monitoring policy after the load driver terminates.

* * * * *